United States Patent
Kanayama et al.

(10) Patent No.: US 8,798,837 B2
(45) Date of Patent: Aug. 5, 2014

(54) VEHICLE HYBRID DRIVE DEVICE

(75) Inventors: Takeshi Kanayama, Toyota (JP); Koji Hayashi, Aichi-gun (JP); Tetsuo Hori, Toyota (JP); Tomoyuki Maruyama, Tajimi (JP); Akiko Nishimine, Toyota (JP); Takeshi Miyagawa, Toyokawa (JP); Tomoaki Furukawa, Toyota (JP); Norihiro Yamamura, Miyoshi (JP); Akihiro Sato, Nagoya (JP); Ryoki Il, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/882,948

(22) PCT Filed: Nov. 4, 2010

(86) PCT No.: PCT/JP2010/069583
§ 371 (c)(1),
(2), (4) Date: May 1, 2013

(87) PCT Pub. No.: WO2012/059996
PCT Pub. Date: May 10, 2012

(65) Prior Publication Data
US 2013/0218394 A1 Aug. 22, 2013

(51) Int. Cl.
*B60L 11/00* (2006.01)
*B60W 10/08* (2006.01)

(52) U.S. Cl.
CPC ...................................... *B60W 10/08* (2013.01)
USPC .......................................................... 701/22

(58) Field of Classification Search
USPC .......................................................... 701/22
See application file for complete search history.

(56) References Cited

U.S. PATENT DOCUMENTS

| | | | |
|---|---|---|---|
| 7,404,460 B2 * | 7/2008 | Oshidari | 180/65.235 |
| 2002/0050259 A1 | 5/2002 | Kojima | |
| 2004/0134698 A1 | 7/2004 | Yamamoto et al. | |
| 2007/0254776 A1 | 11/2007 | Wakashiro et al. | |
| 2008/0227592 A1 * | 9/2008 | Steffen et al. | 477/19 |
| 2010/0324762 A1 | 12/2010 | Imaseki et al. | |
| 2011/0040432 A1 * | 2/2011 | Kaltenbach et al. | 701/22 |
| 2012/0108386 A1 | 5/2012 | Wakashiro et al. | |
| 2012/0138405 A1 * | 6/2012 | Falkenstein | 192/3.54 |
| 2012/0208671 A1 * | 8/2012 | Zhu et al. | 477/5 |
| 2013/0005529 A1 * | 1/2013 | Chen et al. | 477/4 |

FOREIGN PATENT DOCUMENTS

| | | |
|---|---|---|
| JP | A-2002-130094 | 5/2002 |
| JP | A-2004-208477 | 7/2004 |
| JP | A-2006-183547 | 7/2006 |
| JP | A-2007-296975 | 11/2007 |
| JP | A-2008-162315 | 7/2008 |
| JP | A-2009-274566 | 11/2009 |

* cited by examiner

Primary Examiner — Mary Cheung
Assistant Examiner — Anne Mazzara
(74) Attorney, Agent, or Firm — Oliff PLC

(57) ABSTRACT

A vehicle hybrid drive device includes: a first rotating machine coupled to an engine; a connection/disconnection device capable of connecting/disconnecting the engine and the first rotating machine to/from wheels; and a second rotating machine disposed in a manner enabling transmission of drive power to the wheels, the vehicle hybrid drive device enabling a vehicle to run in two running modes of an EV running mode enabling the vehicle to run with the second rotating machine used as a drive power source while the connection/disconnection device is disconnected, and a parallel HEV running mode enabling the vehicle to run with the engine and at least one of the first and second rotating machines as the drive power sources while the connection/disconnection device is connected.

4 Claims, 7 Drawing Sheets

FIG.4

|  |  | ENGINE 12 | MG1 | MG2 | STARTING CLUTCH 26 |
|---|---|---|---|---|---|
| EV |  | STOPPED | FREE | POWER RUNNING | INTERRUPTED |
| SERIES HEV |  | OPERATED | GENERATING | POWER RUNNING | INTERRUPTED |
| PARALLEL HEV | 1 | OPERATED | POWER RUNNING | FREE | ENABLED |
|  | 2 | OPERATED | GENERATING | POWER RUNNING | ENABLED |
|  | 3 | OPERATED | FREE | FREE | ENABLED |
| DECELERATION RUNNING |  | STOPPED | FREE | GENERATING | INTERRUPTED |

FIG.7(a)
CONFIGURATION

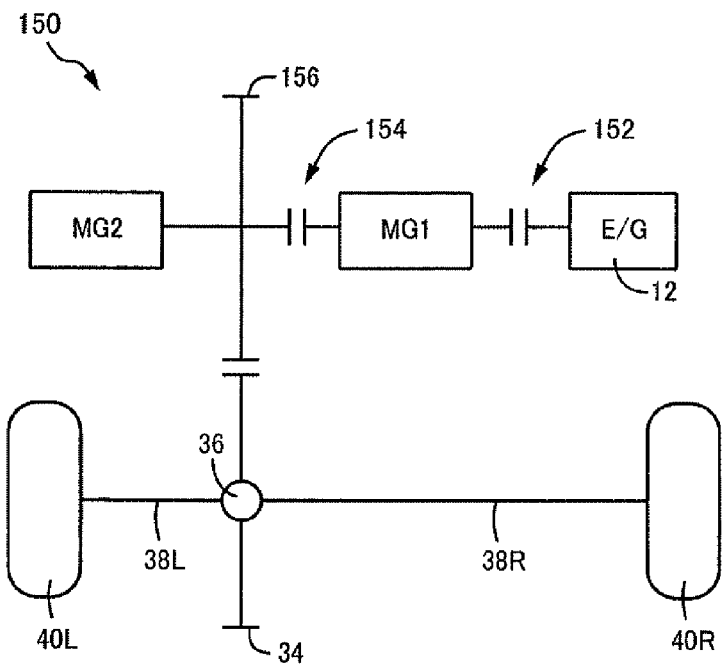

FIG.7(b)
RUNNING MODES

| | | ENGINE 12 | MG1 | MG2 | FIRST CLUTCH 152 | SECOND CLUTCH 154 |
|---|---|---|---|---|---|---|
| EV | | STOPPED | FREE | POWER RUNNING | INTERRUPTED | INTERRUPTED |
| SERIES HEV | | OPERATED | GENERATING | POWER RUNNING | ENABLED | INTERRUPTED |
| PARALLEL HEV | 1 | OPERATED | POWER RUNNING | FREE | ENABLED | ENABLED |
| | 2 | OPERATED | GENERATING | POWER RUNNING | ENABLED | ENABLED |
| | 3 | OPERATED | FREE | FREE | ENABLED | ENABLED |
| DECELERATION RUNNING | | STOPPED | FREE | GENERATING | INTERRUPTED | INTERRUPTED |

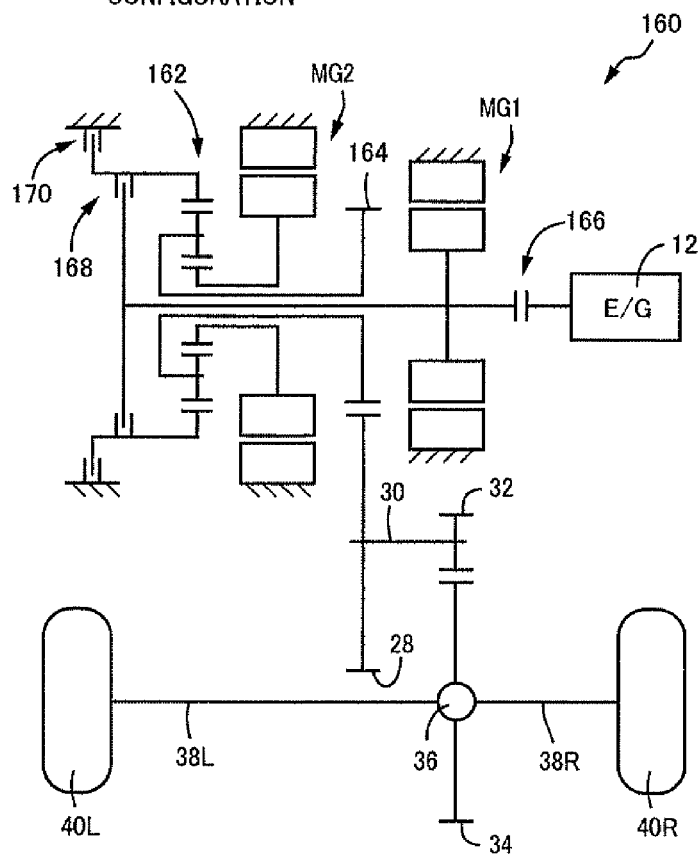

FIG.8(a)
CONFIGURATION

FIG.8(b)
RUNNING MODES

|  |  | ENGINE 12 | MG1 | MG2 | FIRST CLUTCH 166 | SECOND CLUTCH 168 | BRAKE 170 |
|---|---|---|---|---|---|---|---|
| EV |  | STOPPED | FREE | POWER RUNNING | INTERRUPTED | INTERRUPTED | ENGAGED |
| SERIES HEV |  | OPERATED | GENERATING | POWER RUNNING | ENABLED | INTERRUPTED | ENGAGED |
| PARALLEL HEV | 1 | OPERATED | FREE | POWER RUNNING | ENABLED | ENABLED | RELEASED |
|  | 2 | OPERATED | GENERATING | POWER RUNNING | ENABLED | ENABLED | RELEASED |
| DECELERATION RUNNING |  | STOPPED | FREE | GENERATING | INTERRUPTED | INTERRUPTED | ENGAGED |

VEHICLE HYBRID DRIVE DEVICE

TECHNICAL FIELD

The present invention relates to a vehicle hybrid drive device and particularly to improvement of a vehicle hybrid drive device having an EV running mode and a parallel HEV running mode.

BACKGROUND ART

A vehicle hybrid drive device is known (a) that includes a first rotating machine coupled to an engine, a connection/disconnection device capable of connecting/disconnecting the engine and the first rotating machine to/from wheels, and a second rotating machine disposed in a manner enabling transmission of drive power to the wheels and that enables a vehicle to run in two running modes of (b) an EV (electric vehicle) running mode enabling the vehicle to run with the second rotating machine used as a drive power source while the connection/disconnection device is disconnected and (c) a parallel HEV (hybrid electric vehicle) running mode enabling the vehicle to run with the engine and at least one of the first and second rotating machines as the drive power sources while the connection/disconnection device is connected. One example is a device described in Patent Document 1 and an engine running region of FIG. 2 of this publication corresponds to the parallel HEV running mode. A vehicle can also run in a series HEV running mode in which the connection/disconnection device is disconnected to enable the vehicle to run with the second rotating machine as the drive power source while the first rotating machine is rotationally driven to generate electricity by the engine disconnected from the wheels and, for example, the series HEV running mode is implemented in an intermediate region between an EV region for running in the EV running mode and a parallel HEV region for running in the parallel HEV running mode.

PRIOR ART DOCUMENT

Patent Document

Patent Document 1: Japanese Laid-Open Patent Publication No. 2009-274566

SUMMARY OF THE INVENTION

Problem to be Solved by the Invention

However, a conventional vehicle hybrid drive device as described above has a problem that if a direct shift from the EV running mode to the parallel HEV running mode is made through the series HEV running mode, a shift time is elongated, deteriorating responsiveness. If a time of the shift to the parallel HEV running mode is elongated in this way, it takes a longer time until larger drive power is acquired and drivability performance deteriorates and, if the synchronization control is provided by using the first rotating machine when the connection/disconnection device is connected, an electric load and electricity consumption increase in the first rotating machine. On the other hand, although it is conceivable that the shift to the parallel HEV running mode is promptly made by cranking the engine with inertia of output through adjustment of the torque (e.g., engagement oil pressure) of the connection/disconnection device, igniting and starting the engine, and completely engaging the connection/disconnection device, a drive power variation generated by a load at the time of cranking of the engine may reduce riding quality and give a feeling of strangeness to a driver.

The present invention was conceived in view of the situations and it is therefore an object of the present invention to enable the shift from the EV running mode to the parallel HEV running mode satisfying both the riding quality and the responsiveness.

Means for Solving the Problems

To achieve the object, the first aspect of the invention provides a vehicle hybrid drive device comprising: (a) a first rotating machine coupled to an engine; a connection/disconnection device capable of connecting/disconnecting the engine and the first rotating machine to/from wheels; and a second rotating machine disposed in a manner enabling transmission of drive power to the wheels, the vehicle hybrid drive device enabling a vehicle to run in two running modes of (b) an EV running mode enabling the vehicle to run with the second rotating machine used as a drive power source while the connection/disconnection device is disconnected, and (c) a parallel HEV running mode enabling the vehicle to run with the engine and at least one of the first and second rotating machines as the drive power sources while the connection/disconnection device is connected, wherein (d) when the EV running mode is shifted to the parallel HEV running mode, the shift is made in two shift modes of (d-1) a first shift mode in which after the engine is cranked by the first rotating machine and the engine is ignited and started, the connection/disconnection device is connected, and (d-2) a second shift mode in which after the engine is cranked by the first rotating machine and the connection/disconnection device is connected, the engine is ignited and started, and (e) if a driver desires power-performance-oriented running, the EV running mode being shifted in the second shift mode, and if the driver does not desire power-performance-oriented running, the EV running mode being shifted in the first shift mode.

The second aspect of the invention provides the vehicle hybrid drive device recited in the first aspect of the invention, enabling the vehicle to run in a series HEV running mode in which the connection/disconnection device is disconnected to enable a vehicle to run with the second rotating machine as the drive power source while an electric generator is rotationally driven to generate electricity by the engine disconnected from the wheels.

The third aspect of the invention provides the vehicle hybrid drive device recited in the first or second aspect of the invention, (a) in a first shift mode, after the engine is cranked by the first rotating machine and the engine is ignited and started, synchronization control is provided by using the first rotating machine so as to make rotation speeds before and after connecting operation of the connection/disconnection device substantially identical, and, when substantial synchronization is achieved, the connection/disconnection device is connected, (b) in a second shift mode, the engine is cranked by the first rotating machine and the synchronization control is provided by using the first rotating machine so as to make rotation speeds before and after connecting operation of the connection/disconnection device substantially identical, and, when substantial synchronization is achieved, the connection/disconnection device is connected, and, then, the engine is ignited and started, and (c) even if the driver does not desire power-performance-oriented running, the EV running mode is directly shifted to the parallel HEV running mode by selecting the second shift mode when a temperature of the first rotating machine is equal to or higher than a predetermined value.

The Effects of the Invention

In the vehicle hybrid drive device as described above, the two shift modes, i.e., the first shift mode and the second shift mode are included in the case of making the shift from the EV running mode to the parallel HEV running mode and, in the first shift mode, after the engine is cranked by the first rotating machine and the engine is ignited and started, the connection/disconnection device is connected. Therefore, the cranking and starting of the engine pose no risk of drive power variation and favorable riding quality can be ensured.

On the other hand, in the second shift mode, after the engine is cranked by the first rotating machine and the connection/disconnection device is connected, the engine is ignited and started and, therefore, the synchronization control etc., at the time of connection of the connection/disconnection device can promptly be provided without being affected by the engine torque so that the shift to the parallel HEV running mode can promptly be made. Therefore, larger driving force in the parallel HEV running mode can be obtained earlier, and the drivability performance is improved. Since the engine is ignited and started after the connection/disconnection device is connected, the shock (vibration) due to initial explosion torque of the engine is transmitted to the drive system; however, since the engine is cranked by the first rotating machine, drive power variation is not generated by the load at the time of the cranking and, as compared to the case of using inertia of output for cranking and starting the engine, the drive power variation at the start of the engine is improved as a whole. Since the shift to the parallel HEV running mode can be made in a shorter time as compared to the first shift mode, the electric load is decreased and electricity consumption is reduced in the first rotating machine when the synchronization control is provided by using the first rotating machine at the time of connection of the connection/disconnection device, and the switch of mode can properly be made even when an SOC (remaining battery) of a battery is lowered or during high temperature of the first rotating machine, etc.

In the case that the driver does not desire power-performance-oriented running, while favorable riding quality is ensured since the EV running mode is shifted to the parallel HEV running mode in the first shift mode, if a driver desires the power-performance-oriented running, the EV running mode is promptly shifted to the parallel HEV running mode in the second shift mode and, therefore, excellent drivability performance is acquired. Although the shock due to initial explosion torque of the engine may be transmitted to the drive system in the second shift mode, lower risk of causing a feeling of strangeness is posed because the driver desires the power-performance-oriented running.

The third aspect of the invention is the case in which synchronization control is provided by using the first rotating machine when the connection/disconnection device is connected in both the first and second shift modes, the EV running mode is directly shifted to the parallel HEV running mode by selecting the second shift mode when a temperature of the first rotating machine is equal to or higher than a predetermined value, and, since, in the second shift mode, the shift to the parallel HEV running mode can be made in a shorter time as compared to the first shift mode, the electric load is decreased in the first rotating machine, and, even during high temperature of the first rotating machine, the running mode can be properly switched by performing the synchronization control.

BRIEF DESCRIPTION OF THE DRAWINGS

FIG. 4 is a diagram for explaining various running modes and an operating state of each portion in the vehicle hybrid drive device of FIG. 1.

FIG. 7 is a diagram for explaining yet another example of the vehicle hybrid drive device to which the present invention is preferably applied and (a) is a schematic of a configuration while (b) is a diagram of a plurality of the running modes and an operating state of each portion.

FIG. 8 is a diagram for explaining a further example of the vehicle hybrid drive device to which the present invention is preferably applied and (a) is a schematic of a configuration while (b) is a diagram of a plurality of the running modes and an operating state of each portion.

MODES FOR CARRYING OUT THE INVENTION

Figure 1:
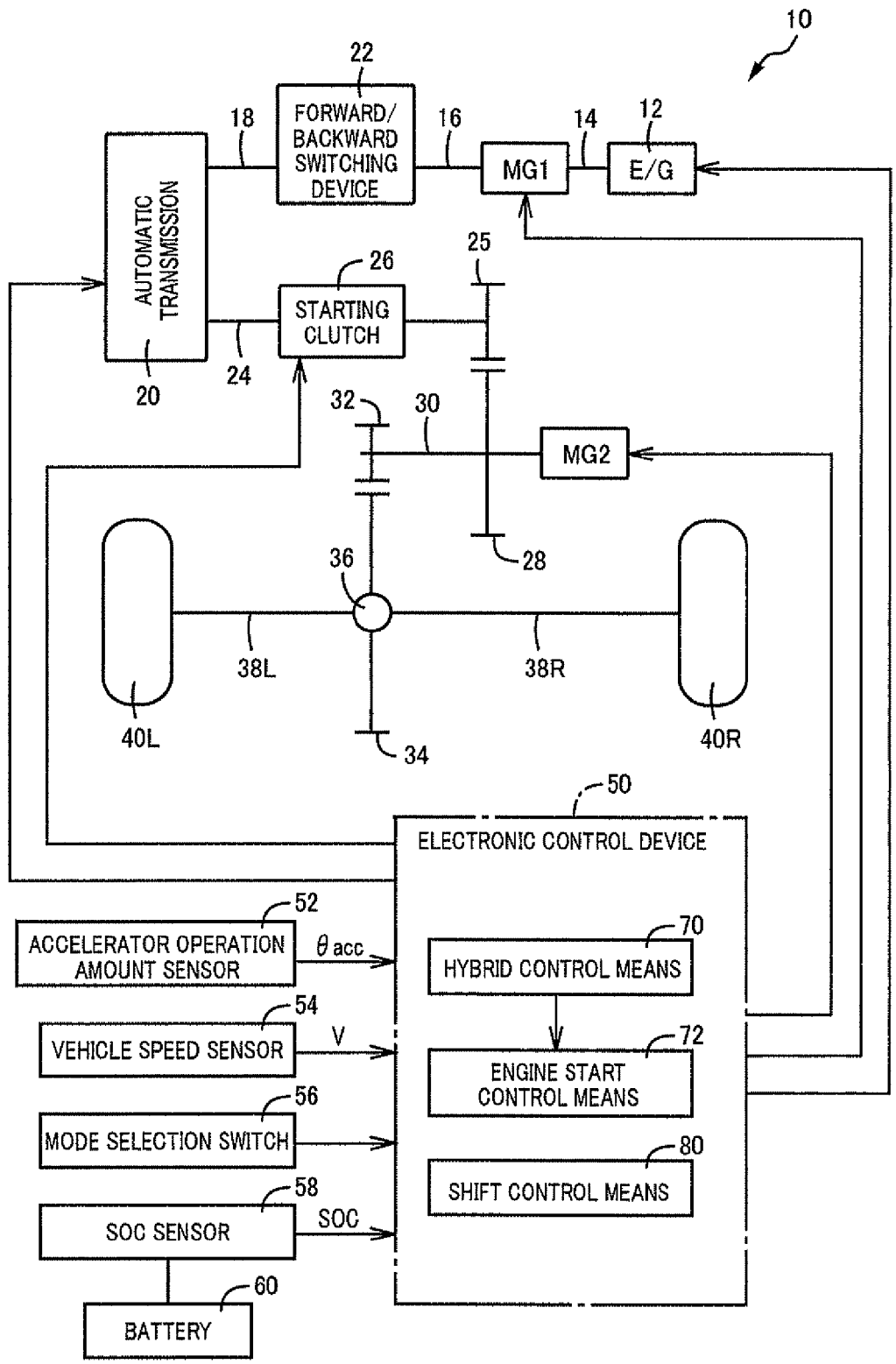
FIG. 1 is a schematic of a configuration of a vehicle hybrid drive device that is one embodiment of the present invention together with a control system when running modes are switched.

The engine is an internal combustion engine combusting fuel to generate power. Although a rotating machine is a rotating electric machine and is specifically an electric generator, an electric motor, or a motor generator selectively providing the functions, a second rotating machine used as a drive power source in the EV running mode needs to have at least a function of an electric motor and is made up of an electric motor or a motor generator. A first rotating machine cranking the engine needs to have at least a function of an electric motor and is made up of an electric motor or a motor generator. The second rotating machine may drive wheels connected via a connection/disconnection device to the engine or can be configured to drive wheels different from those driven by the engine such as driving rear wheels when the engine drives front wheels. The connection/disconnection device can enable/interrupt power transmission and is made up of a friction engagement or meshing clutch and brake or an automatic transmission that can be neutral in which the power transmission is interrupted.

A vehicle hybrid drive device of the present invention may be capable of at least two types of running modes, which are the EV running mode and the parallel HEV running mode, and may also include other running modes such as a series HEV running mode in which the connection/disconnection device is disconnected to enable a vehicle to run with the second rotating machine as the drive power source while an electric generator is rotationally driven to generate electricity by the engine disconnected from the wheels. Although the electric generator in this case can be disposed separately from the first rotating machine, a motor generator may be employed as the first rotating machine to provide the electric generation control (also referred to as regeneration control) of the motor generator.

Although the EV running mode and the series HEV running mode cause the engine to be disconnected from a drive power transmission path by the connection/disconnection device, the parallel HEV running mode causes the engine to be connected to the drive power transmission path by the connection/disconnection device such that the engine can be used as a drive power source for running. In the parallel HEV running mode, the engine and at least one of the first and second rotating machines may always be used as the drive power sources for running or, for example, a rotating machine having excellent responsiveness may be used in an assisting manner. Therefore, the parallel HEV running mode may include the narrowly-defined parallel HEV running mode in which the engine and at least one of the first and second rotating machines are connected to the power transmission path so that the engine and at least one of the first and second rotating machines are used as the drive power sources for running as well as an engine running mode in which only the engine is used as the drive power source for running and a series parallel HEV running mode in which the engine and at least one of the first and second rotating machines are used as the drive power sources for running while the other of the first and second rotating machines is subjected to the electric generation control to generate electricity. In other words, while the engine is always used as a drive power source, at least one of the first and second rotating machines may be used as a drive power source at any time or in an assisting manner.

A plurality of the running modes is switched in accordance with a mode switching condition defined based on at least one of required drive power and vehicle speed, for example, and a two-dimensional mode switching map etc., using the required drive power and the vehicle speed as parameters are set. In general, the EV running mode is selected at lower required drive power and lower vehicle speed and the series HEV running mode and the parallel HEV running mode are selected as the required drive power and the vehicle speed increase. The running modes can be switched in consideration of other additional conditions such as SOC (remaining battery) and temperature of a battery supplying electric power to the rotating machine. Although the required drive power can be replaced with an operation amount of an accelerator operated by a driver, the required drive power includes a drive power request other than the accelerator operation during auto cruise control etc.

The present invention relates to the control when the EV running mode is shifted to the parallel HEV running mode and is applied when the mode switching condition is defined such that the EV running mode is directly shifted to the parallel HEV running mode if the required drive power increases in a predetermined vehicle speed region, for example. Even if a region for running in the series HEV running mode is disposed between the EV running mode and the parallel HEV running mode, the present invention may be applied when the region is relatively narrow and a slight increase in the required drive power or vehicle speed passes through the series HEV region and substantially directly shifts the EV running mode to the parallel HEV running mode. The present invention may be applied to various cases of directly shifting the EV running mode to the parallel HEV running mode such as when a selection switch inhibiting the series HEV running mode is provided and the selection switch is operated to inhibit the series HEV running mode so that the EV running mode is directly switched to the parallel HEV running mode.

In a first shift mode, after the engine is cranked by the first rotating machine and the engine is ignited and started, the connection/disconnection device is connected and, when the connection/disconnection device is connected, synchronization control is desirably provided by using the first rotating machine so as to make rotation speeds before and after connecting operation of the connection/disconnection device substantially identical. In a second shift mode, after the engine is cranked by the first rotating machine and the connection/disconnection device is connected, the engine is ignited and started and, therefore, the synchronization control is desirably provided by using the first rotating machine when the connection/disconnection device is connected. Since the synchronization control is desirably provided after the engine is completely started in the first shift mode, a shift time until completion of the connection of the connection/disconnection device is elongated and an electric load of the first rotating machine is increased as compared to the second shift mode. Since the engine is ignited and started after the connection/disconnection device is connected in the second shift mode, shock (vibration) due to initial explosion torque of the engine is transmitted to a drive system and, therefore, compensation control etc., for preventing the shock are desirably provided by using the first rotating machine or the second rotating machine.

Although the first shift mode and the second shift mode are switched depending on whether the driver desires power-performance-oriented running in the first aspect of the invention, the two shift modes may be switched from a different standpoint other than a driver's intention and, for example, the second shift mode generating a smaller electric load may be used if the SOC of the battery is small or if the temperature of the first rotating machine is high. In other words, when the EV running mode is shifted to the parallel HEV running mode, the shift may be made in the second shift mode if responsiveness is required or the shift may be made in the first shift mode if responsiveness is not required.

In the first aspect of the present invention, the second shift mode is used if a driver desires power-performance-oriented running and, for example, if a driver operates a selecting operation member related to power performance such as a power mode, the second shift mode is selected. In other cases, if a sequential mode or manual mode enabling gears to be changed by manual operation is selected when an automatic transmission is included, or if a lower speed range such as an L-range and a second range is selected, it may be determined that the power performance is considered important, and the second shift mode may be selected. Whether the power performance is considered importance can be determined to switch the shift mode, based on a change rate of an accelerator operation amount, an operation tendency of accelerator and brake pedals, and a driver's preference for driving such as acceleration/deceleration of vehicle speed.

FIRST EMBODIMENT

Embodiments of the present invention will now be described in detail with reference to the drawings.

FIG. 1 is a schematic of a configuration of a vehicle hybrid drive device 10 that is one embodiment of the present invention and the vehicle hybrid drive device 10 includes an engine 12, a first motor generator MG1 coupled to a crankshaft 14 of the engine 12, a forward/backward switching device 22 coupled via an intermediate shaft 16 to the first motor generator MG1 and coupled via an input shaft 18 to an automatic transmission 20, a starting clutch 26 disposed between an output shaft 24 of the automatic transmission 20 and a first gear 25 to enable/interrupt the power transmission, a counter shaft 30 disposed with a second gear 28 engaging with the first gear 25, a second motor generator MG2 coupled to the counter shaft 30, a third gear 32 disposed on the counter shaft 30, a differential gear device 36 disposed with a fourth gear 34 engaging with the third gear 32, and left and right front drive wheels 40L and 40R coupled via left and right axles 38L and 38R to the differential gear device 36. The engine 12 is made up of an internal combustion engine combusting fuel to generate power and each of the first motor generator MG1 and the second motor generator MG2 can be used as an electric motor and an electric generator.

Figure 2:
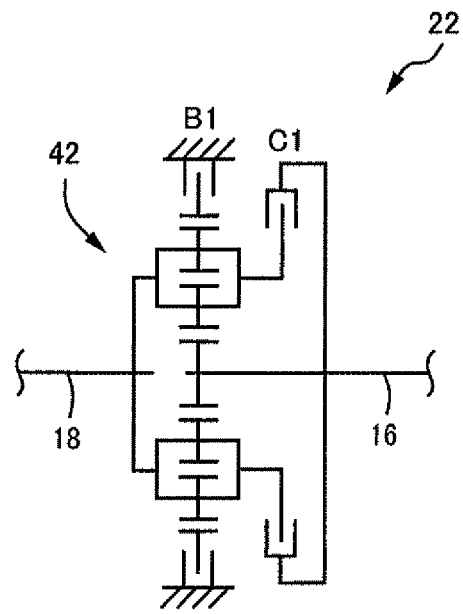
FIG. 2 is a schematic of an example of a forward/backward switching device of FIG. 1.

The forward/backward switching device 22 includes a double pinion type planetary gear device 42, a forward clutch C1, and a backward brake B1 as depicted in FIG. 2, for example. Specifically, a sun gear of the planetary gear device 42 is coupled to the intermediate shaft 16 and a carrier is coupled to the input shaft 18 and is selectively coupled via the forward clutch C1 to the intermediate shaft 16 while a ring gear is selectively non-rotatably fixed via the backward brake B1. When both the forward clutch C1 and the backward brake B1 are released, the power transmission between the intermediate shaft 16 and the input shaft 18 is interrupted; when the forward clutch C1 is connected and the backward brake B1 is released, a forward drive state is achieved to transmit the rotation of the intermediate shaft 16 directly to the input shaft 18; and when the forward clutch C1 is released and the backward brake B1 is fixed, a backward drive state is achieved to reverse and transmit the rotation of the intermediate shaft 16 to the input shaft 18. The forward clutch C1 and the backward brake B1 are made up of hydraulic friction engagement devices, for example. The forward/backward switching device 22 may have various forms such as those configured by using a single pinion type planetary gear device.

The automatic transmission 20 is made up of a belt type continuously variable transmission in this embodiment and includes an input-side pulley and an output-side pulley. The input-side pulley is disposed concentrically to the engine 12, the first motor generator MG1, and the forward/backward switching device 22 and the output-side pulley is disposed concentrically to the starting clutch 26 and the first gear 25. The starting clutch 26 is a hydraulic friction engagement device and corresponds to a connection/disconnection device enabling/interrupting the power transmission between the output shaft 24 and the first gear 25. The first motor generator MG1 corresponds to the first rotating machine and the second motor generator MG2 corresponds to the second rotating machine. The forward/backward switching device 22 capable of being neutral to interrupt the power transmission can be used as the connection/disconnection device.

The vehicle hybrid drive device 10 configured as above includes an electronic control device 50 providing the hybrid control of switching the drive force sources for running in a plurality of running modes and the shift control of the automatic transmission 20. The electronic control device 50 includes a microcomputer, executes signal processes in accordance with programs stored in advance in a ROM while utilizing a temporary storage function of a RAM, and is supplied with signals indicative of an accelerator operation amount θacc that is an operation amount of an accelerator pedal, a vehicle speed V, a selection mode, and an SOC (remaining battery) of a battery 60 that is a power source of the first motor generator MG1 and the second motor generator MG2 from an accelerator operation amount sensor 52, a vehicle speed sensor 54, a mode selection switch 56, and an SOC sensor 58, respectively. Although not depicted, the rotation speed of the engine 12 and the rotation speeds of the first motor generator MG1 and the second motor generator MG2 are detected by respective rotation speed sensors and various pieces of information necessary for various controls are supplied from sensors etc.

The mode selection switch 56 is a selection operation member disposed on an instrument panel, a steering wheel, etc., to allow a driver to select the power mode oriented to the running performance or the eco-mode oriented to the fuel efficiency, can alternatively select one of the power mode and the eco mode, and is set to a normal mode if no selection is made. The automatic transmission 20 is subjected to the shift control in accordance with predefined different shift conditions, for example, a power pattern in which a target input rotation speed for the vehicle speed V is maintained at relatively higher rotation (on the low gear side) or an eco-pattern in which a target input rotation speed for the vehicle speed V is maintained at relatively lower rotation (on the high gear side), depending on either the power mode or the eco-mode. The SOC is obtained by sequentially calculating a charge amount and a discharge amount of the battery 60, for example.

The electronic control device 50 basically functionally includes a hybrid control means 70 and a shift control means 80. The shift control means 80 provides the shift control of the automatic transmission 20 during the parallel HEV running in which the engine 12 is used as the drive power source, and adjusts a pulley width such that an input rotation speed is changed in accordance with a target input rotation speed map predefined by using, for example, the required drive power such as the accelerator operation amount θacc and the vehicle speed V as parameters, thereby controlling a gear ratio γ.

The hybrid control means 70 switches a plurality of types of running modes depicted in FIG. 4 for running. In an EV running mode of FIG. 4, the starting clutch 26 is put into an interruption state to disconnect the engine 12 from the drive power transmission path and the second motor generator MG2 is subjected to power running control for forward or backward running. In a series HEV running mode, while the starting clutch 26 is put into the interruption state to disconnect the engine 12 from the drive power transmission path, the engine 12 is operated to rotationally drive the first motor generator MG1 and, while the first motor generator MG1 is subjected to electric generation control (also referred to as regeneration control), the second motor generator MG2 is subjected to the power running control for forward or backward running as is the case with the EV running mode. The electric power acquired by the first motor generator MG1 is supplied to the second motor generator MG2 or used for charging the battery 60. The power running control means that a motor generator is used as an electric motor and the electric generation control means that a motor generator is used as an electric generator.

A parallel HEV running mode is a mode in which the starting clutch 26 is connected to connect the engine 12 to the drive power transmission path so that the engine 12, the first motor generator MG1, and the second motor generator MG2 can be used as drive power sources for running, and includes three sub-modes. In a first sub-mode 1 (narrowly-defined parallel HEV running mode), the engine 12 is operated and the first motor generator MG1 is subjected to the power running control so that the engine 12 and the first motor generator MG1 are used as the drive power sources for running while the second motor generator MG2 is freely rotated with zero torque. The second motor generator MG2 may be subjected to the power running control instead of the first motor generator MG1 or both the first motor generator MG1 and the second motor generator MG2 may be subjected to the power running control to generate drive power. In a second sub-mode 2 (series parallel HEV running mode), the engine 12 is operated and the second motor generator MG2 is subjected to the power running control so that the engine 12 and the second motor generator MG2 are used as the drive power sources for running while the first motor generator MG1 is subjected to the electric generation control. The electric power acquired by the first motor generator MG1 is supplied to the second motor generator MG2 or used for charging the battery 60. In the sub-mode 2, the first motor generator MG1 may be subjected to the power running control and used as a drive power source and the second motor generator MG2 may be subjected to the electric generation control. In a third sub-mode 3 (engine running mode), the engine 12 is operated so that only the engine 12 is used as the drive power source for running and both the first motor generator MG1 and the second motor generator MG2 are freely rotated with zero torque.

The sub-mode 1 (narrowly-defined parallel HEV running mode) can generate larger drive power as compared to the sub-mode 3 (engine running mode) and, for example, when the first motor generator MG1 is subjected to the power running control in an assisting manner at the time of an acceleration request due to a rapid increase in the accelerator operation amount θacc or during high speed running, the sub-mode 3 is promptly switched to the sub-mode 1. Although the sub-mode 2 (series parallel HEV running mode) is implemented in the same way as the sub-mode 1, the sub-mode 1 is implemented if the SOC of the battery 60 is relatively larger and the sub-mode 2 is implemented if the SOC is relatively smaller. In these parallel HEV running modes, the forward/backward switching device 22 switches the forward drive state and the backward drive state depending on an operation position of a shift lever not depicted.

During deceleration running with an accelerator turned off while the accelerator operation amount θacc is substantially zero, a deceleration running mode is implemented. In the deceleration running mode, the starting clutch 26 is put into the interruption state to disconnect the engine 12 from the drive power transmission path and the second motor generator MG2 is subjected to the electric generation control so that a rotation resistance due to the electric generation control causes a braking force to act on a vehicle while the battery 60 is charged with generated electric energy. Another running mode may further be provided such that the first motor generator MG1 is subjected to the electric generation control during the engine running (sub-mode 3) to charge the battery 60, for example.

Figure 3:
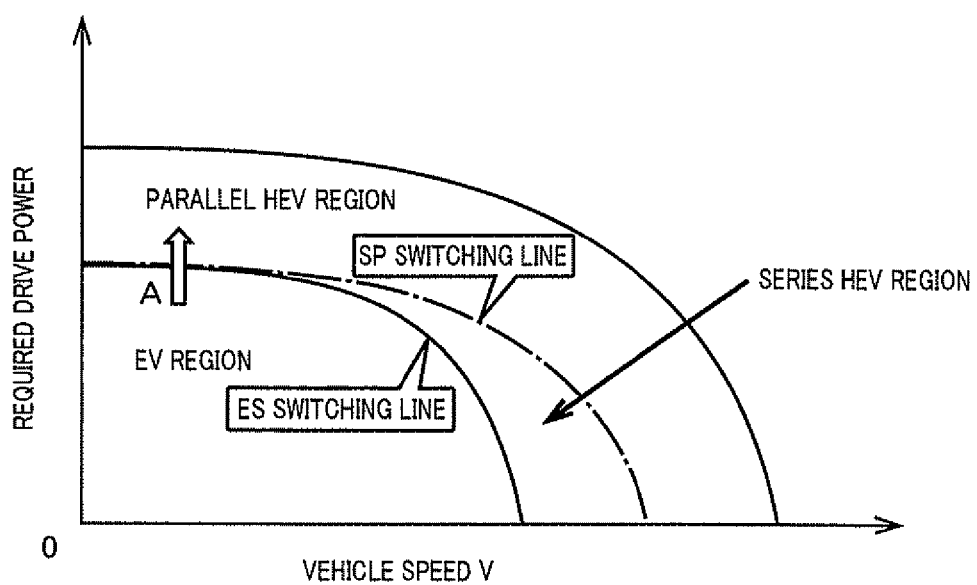
FIG. 3 is a diagram of an example of a mode switching map for switching an EV running mode, a series HEV running mode, and a parallel HEV running mode.

The hybrid control means 70 switches the EV running mode, the series HEV running mode, and the parallel HEV running mode for running in accordance with a predefined mode switching condition. The mode switching condition is preset as a two-dimensional mode switching map by using, for example, the required drive power such as the accelerator operation amount θacc and the vehicle speed V as parameters as depicted in FIG. 3 to define an EV region for running in the EV running mode on the lower required drive force/lower vehicle speed side relative to an ES switching line, a series HEV region for running in the series HEV running mode between SP switching line indicated by a dashed-dotted line and the ES switching line, and a parallel HEV region for running in the parallel HEV running mode on the higher required drive force/higher vehicle speed side relative to the SP switching line. These switching lines are provided with hysteresis for preventing the frequent switching of the running modes due to a slight change in the vehicle speed or required drive power.

Figure 5:
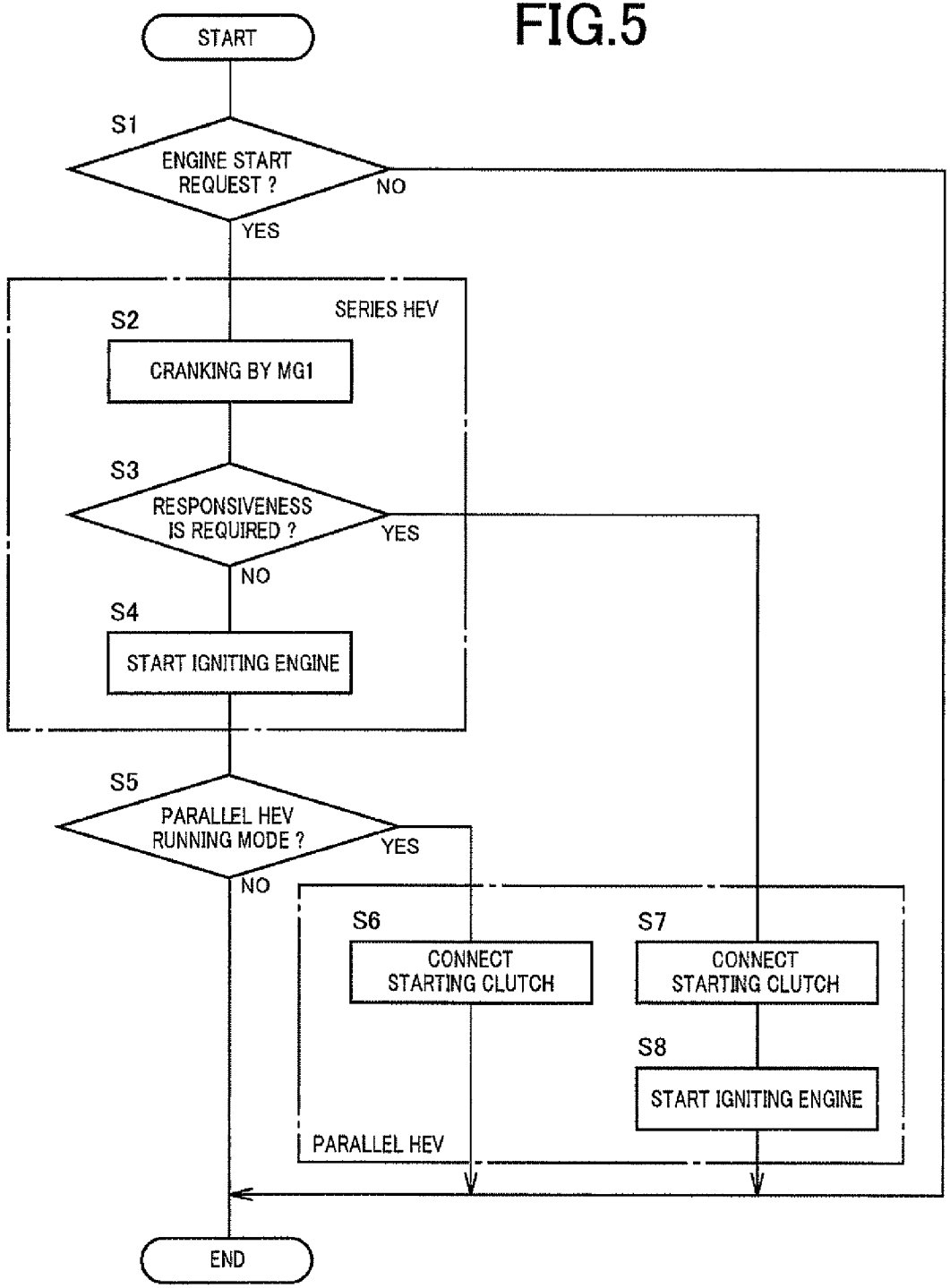
FIG. 5 is a flowchart for specifically explaining an operation of an engine start control means of FIG. 1.

The electronic control device 50 includes an engine start control means 72 and starts the engine 12 in accordance with a flowchart of FIG. 5 if the hybrid control means 70 selects a running mode in which the engine 12 needs to be started. At step S1 of FIG. 5, it is determined whether the engine 12 needs to be started in the running mode selected by the hybrid control means 70. If the engine 12 does not need to be started, the process is terminated or if the engine 12 needs to be started, step S2 and later are executed.

At step S2, the first motor generator MG1 is subjected to the power running control to crank the engine 12 and it is determined at step 3 whether the responsiveness is required for switching the mode. The responsiveness is required when the EV running mode is directly switched to the parallel HEV running mode and at least one of the following conditions (a) to (c) is satisfied. The EV running mode is directly switched to the parallel HEV running mode when the hybrid control means 70 determines that the shift is made to the parallel HEV running mode in accordance with the mode switching map of FIG. 3 etc., while the engine 12 is stopped, and this corresponds to the case that the required drive power increases in a vehicle speed region in which the ES switching line is substantially identical to the SP switching line, and crosses the switching lines as indicated by a white arrow A in FIG. 3, for example. Even if the series HEV region exists between the EV region and the parallel HEV region, when the series HEV region is relatively narrow and a slight increase in the required drive power or vehicle speed V passes through the series REV region, the shift to the parallel HEV running mode is determined, (a) a driver desiring the power-performance-oriented running;
(b) a low remaining battery when the SOC of the battery 60 is equal to or less than a predetermined value; and
(c) a high temperature when the temperature of the first motor generator MG1 is equal to or higher than a predetermined value.

Although the condition (a) corresponds to the case that the power mode is selected with the mode selection switch 56, if a sequential mode or manual mode is selected that enables the gear ratio γ of the automatic transmission 20 to be switched by manual operation, or if a change rate (increase rate) of the accelerator operation amount θacc is larger, whether the power-performance-oriented running is desired is determined from a driver's driving state. If a driver desires the power-performance-oriented running, it is required to reduce a mode switching time and make the shift as early as possible to the parallel HEV running mode in which larger drive power is acquired. In the cases of (b) or (c), it is required to reduce a mode switching time and make the shift to the parallel HEV running mode as early as possible for decreasing the loads of the battery 60 and the first motor generator MG1 or for reducing electricity consumption.

If it is determined that the responsiveness is required, step S7 is executed to provide the synchronization control by the first motor generator MG1 to make the rotation speeds before and after the starting clutch 26 substantially identical while the engine 12 is cranked, and when the rotation speeds are substantially synchronized, the starting clutch 26 is connected through hydraulic control etc. Since the engine 12 does not rotate by itself at this stage, the synchronization control can promptly be provided without being affected by engine torque to connect the starting clutch 26. The forward/backward switching device 22 is put into a power transmittable state by engaging the forward clutch C1 or the backward brake B1 at least before the synchronization control.

At next step S8, the fuel injection and ignition are performed for the cranked engine 12 to start the engine 12. Since the starting clutch 26 is already connected then, shock (vibration) due to initial explosion of the engine 12 is transmitted to the drive system. Therefore, the compensation control etc., for suppressing the shock can be provided by using the first motor generator MG1 or the second motor generator MG2. As a result, the parallel HEV running mode is established and, when steps S2, S3, S7, and S8 are executed in this way to start the engine 12 after connecting the starting clutch 26 for making the shift to the parallel HEV running mode, this control is the second shift mode.

On the other hand, if the determination at step S3 is NO (negative), i.e., it is determined that the responsiveness is not required, step S4 is executed and the fuel injection and ignition are performed for the engine 12 to start the engine 12. Since the starting clutch 26 is still disconnected at this stage, this is substantially the series HEV running mode. This poses no risk of transmitting the shock (vibration) due to initial explosion of the engine 12 to the drive system. At next step S5, it is determined whether the hybrid control means 70 determines to make the shift to the parallel HEV running mode and if the shift to the parallel HEV running mode is not determined, the process is terminated without change and the series HEV running mode is maintained.

If the determination at step S5 is YES (affirmative), i.e., if the shift to the parallel HEV running mode is determined, step S6 is executed to provide the synchronization control by the first motor generator MG1 such that the rotation speeds before and after the starting clutch 26 become substantially identical and, when the rotation speeds are substantially synchronized, the starting clutch 26 is connected through hydraulic control etc. As a result, the parallel HEV running mode is established and, when steps S2, S3, S4, S5, and S6 are executed in this way to connect the starting clutch 26 after starting the engine 12 for making the shift to the parallel HEV running mode, this control is the first shift mode.

As described above, in the vehicle hybrid drive device 10 of this embodiment, the two shift modes, i.e., the first shift mode (steps S2 to S6) and the second shift mode (steps S2, S3, S7, and S8) are included in the case of making the shift from the EV running mode to the parallel HEV running mode and, in the first shift mode, after the engine 12 is cranked by the first motor generator MG1 and the engine 12 is ignited and started (step S4), the starting clutch 26 is connected (step S6). Therefore, the cranking and starting of the engine 12 pose no risk of drive power variation and favorable riding quality can be ensured.

On the other hand, in the second shift mode, after the engine 12 is cranked by the first motor generator MG1 and the starting clutch 26 is connected (step S7), the engine 12 is ignited and started (step S8) and, therefore, the synchronization control at the time of connection of the starting clutch 26 can promptly be provided without being affected by the engine torque so that the shift to the parallel HEV running mode can promptly be made. Therefore, larger driving force in the parallel HEV running mode can be obtained earlier, and the drivability performance is improved.

In the second shift mode, since the engine 12 is ignited and started after the starting clutch 26 is connected, the shock (vibration) due to initial explosion torque of the engine 12 may be transmitted to the drive system; however, since the engine 12 is cranked by the first motor generator MG1, drive power variation is not generated by the load at the time of the cranking and, as compared to the case of using inertia of output for cranking and starting the engine 12, the drive power variation at the start of the engine is improved as a whole. When the engine 12 is cranked by inertia of output torque and started, if the vehicle speed V is low, the engine 12 cannot sufficiently be cranked and cannot be started; however, since the engine 12 is cranked by the first motor generator MG1 in the second shift mode, the engine 12 can be cranked and started even at lower vehicle speed without being limited by the vehicle speed V.

In the second shift mode, the shift to the parallel HEV running mode can be made in a shorter time as compared to the first shift mode, and the electric load is decreased and electricity consumption is reduced in the first motor generator MG1 providing the synchronization control at the time of connection of the starting clutch 26 as compared to the first shift mode. Therefore, the EV running mode can properly be shifted to the parallel HEV running mode even at a low remaining battery when the SOC of the battery 60 is small or during high temperature of the first motor generator MG1.

Since the two shift modes are switched depending on a driver's intention in this embodiment, the drivability performance and the riding quality performance intended by a driver can be acquired. In other words, while favorable riding quality is ensured since the EV running mode is normally shifted to the parallel HEV running mode in the first shift mode, if a driver desires the power-performance-oriented running such as when the power mode is selected, the EV running mode is promptly shifted to the parallel HEV running mode in the second shift mode and, therefore, excellent drivability performance is acquired. Although the shock due to initial explosion torque of the engine 12 may be transmitted to the drive system in the second shift mode, a certain degree of shock poses lower risk of causing a feeling of strangeness in a driver because the driver desires the power-performance-oriented running.

Other embodiments of the present invention will be described. In the following embodiments, the portions substantially common to the embodiments are denoted by the same reference numerals and will not be described in detail.

SECOND EMBODIMENT

Figure 6:
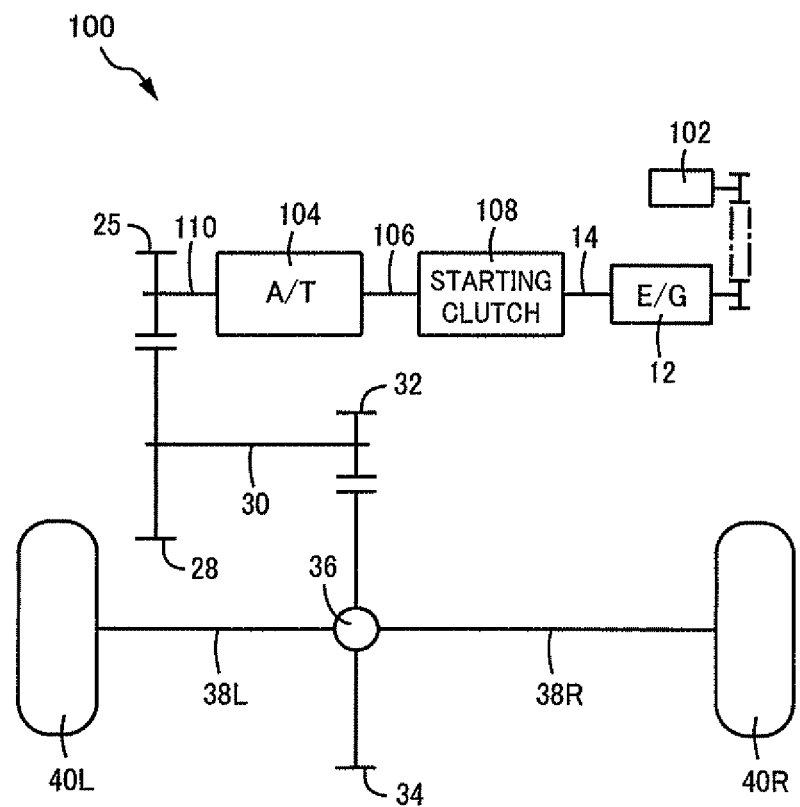
FIG. 6 is a schematic of a configuration of another example of the vehicle hybrid drive device to which the present invention is preferably applied.
Figure 6:
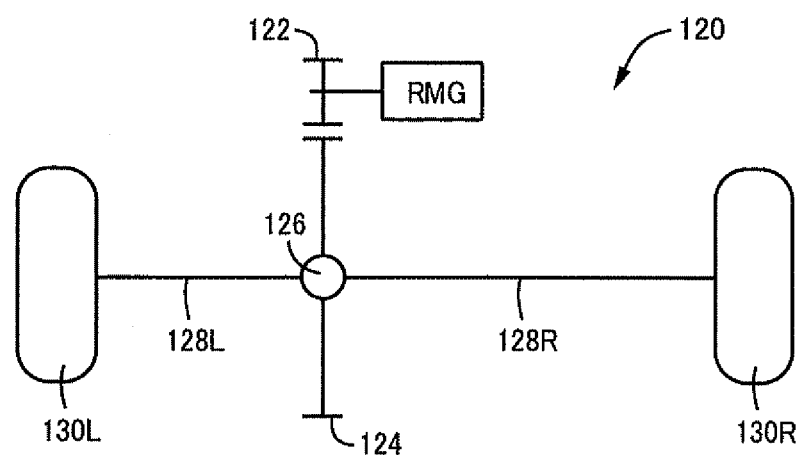

FIG. 6 is a schematic of a configuration of another example of the vehicle hybrid drive device to which the present invention is preferably applied. A vehicle hybrid drive device 100 has the engine 12 cranked by a starter motor 102 coupled via a belt etc., to the crankshaft 14 and includes a stepped automatic transmission 104 of a planetary gear type etc., with a plurality of gear stages and neutral established depending on an engagement/release state of a plurality of clutches and brakes, and a starting clutch 108 enabling/interrupting power transmission is disposed between an input shaft 106 of the automatic transmission 104 and the crankshaft 14. The starter motor 102 corresponds to a first rotating machine and is made up of a motor generator also having a function of an electric generator. Although the starting clutch 108 corresponds to the connection/disconnection device in this embodiment, the automatic transmission 104 capable of being neutral can be used as the connection/disconnection device. The first gear 25 is disposed on an output shaft 110 of the automatic transmission 104 to transmit the drive power to the front drive wheels 40L and 40R. The second motor generator MG2 is not included.

On the other hand, the vehicle hybrid drive device 100 includes a rear wheel drive device 120 and a rear motor generator RMG rotationally drives a differential gear device 126 via a fifth gear 122 and a sixth gear 124 to rotationally drive left and right rear drive wheels 130L and 130R via left and right axles 128L and 128R. The rear motor generator RMG corresponds to the second rotating machine.

The vehicle hybrid drive device 100 includes the hybrid control means 70 as is the case with the vehicle hybrid drive device 10 of the embodiment to switch the various running modes depicted in FIG. 4 for running and has the engine start control means 72 making the switch of mode from the EV running mode in accordance with the flowchart of FIG. 5. In FIG. 4, the first motor generator MG1, the second motor generator MG2, and the starting clutch 26 are replaced with the starter motor 102, the rear motor generator RMG and the starting clutch 108, respectively. Substantially the same effect as the first embodiment is acquired in this embodiment.

In the engine running mode (the sub-mode 3 of the parallel HEV running mode), the rear drive wheels 130L and 130R can rotationally be driven by the rear motor generator RMG as needed for running in the four-wheel drive state. Reduction gears and a connection/disconnection device such as a clutch may be disposed as needed between the rear motor generator RMG and the fifth gear 122. A drive device acquired by removing the second motor generator MG2 from the first embodiment can directly be employed as a drive device for driving front wheels.

THIRD EMBODIMENT

FIG. 7 is a diagram for explaining yet another example of the vehicle hybrid drive device to which the present invention is preferably applied and (a) is a schematic of a configuration while (b) is a diagram for explaining various running modes. This vehicle hybrid drive device 150 has the engine 12, a first clutch 152, the first motor generator MG1, a second clutch 154, and the second motor generator MG2 coupled in series on a common axis line and an output gear 156 disposed between the second clutch 154 and the second motor generator MG2 is engaged with the fourth gear 34. As depicted in (b) of FIG. 7, the vehicle hybrid drive device 150 enables the EV running mode, the series HEV running mode, the parallel HEV running mode having three sub-modes, and the deceleration running mode as is the case with the first embodiment, uses the hybrid control means 70 to switch those running modes for running, and uses the engine start control means 72 to make the switch of mode from the EV running mode in accordance with the flowchart of FIG. 5. However, the first clutch 152 is connected before the cranking of step S2 and the second clutch 154 is connected instead of the starting clutch 26 at steps S6 and S7. Substantially the same effect as the first embodiment is acquired in this embodiment.

Since the vehicle cannot go backward in the engine running mode (the sub-mode 3 of the parallel HEV running mode) in this embodiment, backward running is performed in the EV running mode or the series HEV running mode. The second clutch 154 corresponds to the connection/disconnection device that disconnects the engine 12 from the drive power transmission path in the EV running mode and the series HEV running mode.

FOURTH EMBODIMENT

FIG. 8 is a diagram for explaining a further example of the vehicle hybrid drive device to which the present invention is preferably applied and (a) is a schematic of a configuration while (b) is a diagram for explaining various running modes. This vehicle hybrid drive device 160 has the engine 12, the first motor generator MG1, the second motor generator MG2, and an output gear 164 connected via a planetary gear device 162 and has a first clutch 166 disposed between the engine 12 and the first motor generator MG1 while the first motor generator MG1 is coupled via a second clutch 168 to a ring gear of the planetary gear device 162. The ring gear is non-rotatably fixed by a brake 170. The planetary gear device 162 has a sun gear coupled to the second motor generator MG2 and a carrier coupled to the output gear 164 while the output gear 164 is engaged with the second gear 28.

As depicted in (b) of FIG. 8, the vehicle hybrid drive device 160 enables the EV running mode, the series HEV running mode, the parallel HEV running mode, and the deceleration running mode as is the case with the first embodiment, uses the hybrid control means 70 to switch those running modes for running, and uses the engine start control means 72 to make the switch of mode from the EV running mode in accordance with the flowchart of FIG. 5. However, the first clutch 166 is connected before the cranking of step S2 and the second clutch 168 is connected instead of the starting clutch 26 and the brake 170 is released at steps S6 and S7. Substantially the same effect as the first embodiment is acquired in this embodiment.

In FIG. 8(b), the brake 170 is fixed and the second motor generator MG2 is subjected to the power running control for running in the EV running mode; however, the brake 170 can be released with the second clutch 168 connected so that both the first motor generator MG1 and the second motor generator MG2 can be subjected to the power running control for running. The parallel HEV running mode enables two sub-bodes, and a sub-mode 1 in the upper row is the narrowly-defined parallel HEV running mode in which both the engine 12 and the second motor generator MG2 are used as the drive power source for running. A sub-mode 2 in the lower row is the series parallel HEV running mode in which the first motor generator MG1 is subjected to the electric generation control in the sub-mode 1. The backward running may be performed in the EV running mode or the series HEV running mode. The second clutch 168 corresponds to the connection/disconnection device that disconnects the engine 12 from the drive power transmission path in the EV running mode and the series HEV running mode.

Although the embodiments of the present invention have been described in detail with reference to the drawings, these are merely exemplary embodiments and the present invention may be implemented in variously modified and improved forms based on the knowledge of those skilled in the art,

NOMENCLATURE OF ELEMENTS 10, 100, 150, 160: vehicle hybrid drive device 12: engine 26, 108: starting clutch (connection/disconnection device) 50: electronic control device 72: engine start control means 102: starter motor (first rotating machine) 154, 168: second clutch (connection/disconnection device) MG1: first motor generator (first rotating machine) MG2: second motor generator (second rotating machine) RMG: rear motor generator (second rotating machine) steps S2 to S6: first shift mode steps S2, S3, S7, S8: second shift mode

The invention claimed is:

1. A vehicle hybrid drive device comprising: a first rotating machine coupled to an engine; a connection/disconnection device capable of connecting/disconnecting the engine and the first rotating machine to/from wheels; and a second rotating machine disposed in a manner enabling transmission of drive power to the wheels, the vehicle hybrid drive device enabling a vehicle to run in two running modes of an EV running mode enabling the vehicle to run with the second rotating machine used as a drive power source while the connection/disconnection device is disconnected, and a parallel HEV running mode enabling the vehicle to run with the engine and at least one of the first and second rotating machines as the drive power sources while the connection/disconnection device is connected, when the EV running mode is shifted to the parallel HEV running mode, the shift being made in two shift modes of a first shift mode in which after the engine is cranked by the first rotating machine and the engine is ignited and started, the connection/disconnection device is connected, and a second shift mode in which after the engine is cranked by the first rotating machine and the connection/disconnection device is connected, the engine is ignited and started, and if a driver desires power-performance-oriented running, the EV running mode being shifted in the second shift mode, and if the driver does not desire power-performance-oriented running, the EV running mode being shifted in the first shift mode.

2. The vehicle hybrid drive device of claim 1, enabling the vehicle to run in a series HEV running mode in which the connection/disconnection device is disconnected to enable a vehicle to run with the second rotating machine as the drive power source while an electric generator is rotationally driven to generate electricity by the engine disconnected from the wheels.

3. The vehicle hybrid drive device of claim 2, wherein in a first shift mode, after the engine is cranked by the first rotating machine and the engine is ignited and started, synchronization control is provided by using the first rotating machine so as to make rotation speeds before and after connecting operation of the connection/disconnection device substantially identical, and, when substantial synchronization is achieved, the connection/disconnection device is connected, in a second shift mode, the engine is cranked by the first rotating machine and the synchronization control is provided by using the first rotating machine so as to make rotation speeds before and after connecting operation of the connection/disconnection device substantially identical, and, when substantial synchronization is achieved, the connection/disconnection device is connected, and, then, the engine is ignited and started, and even if the driver does not desire power-performance-oriented running, the EV running mode is directly shifted to the parallel HEV running mode by selecting the second shift mode when a temperature of the first rotating machine is equal to or higher than a predetermined value.

4. The vehicle hybrid drive device of claim 1, wherein in a first shift mode, after the engine is cranked by the first rotating machine and the engine is ignited and started, synchronization control is provided by using the first rotating machine so as to make rotation speeds before and after connecting operation of the connection/disconnection device substantially identical, and, when substantial synchronization is achieved, the connection/disconnection device is connected, in a second shift mode, the engine is cranked by the first rotating machine and the synchronization control is provided by using the first rotating machine so as to make rotation speeds before and after connecting operation of the connection/disconnection device substantially identical, and, when substantial synchronization is achieved, the connection/disconnection device is connected, and, then, the engine is ignited and started, and even if the driver does not desire power-performance-oriented running, the EV running mode is directly shifted to the parallel HEV running mode by selecting the second shift mode when a temperature of the first rotating machine is equal to or higher than a predetermined value.

* * * * *